United States Patent
Szapiel (10) Patent No.: US 12,360,354 B2
(45) Date of Patent: Jul. 15, 2025

(54) OPTICAL SIGHTING DEVICES AND METHODS FOR AUTOMATICALLY ADJUSTING AN EYEBOX

(71) Applicant: Raytheon Canada Limited, Ottawa (CA)

(72) Inventor: Stanislaw Szapiel, Ottawa (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 424 days.

(21) Appl. No.: 17/778,294

(22) PCT Filed: Nov. 21, 2019

(86) PCT No.: PCT/CA2019/000158
§ 371 (c)(1),
(2) Date: May 19, 2022

(87) PCT Pub. No.: WO2021/097548
PCT Pub. Date: May 27, 2021

(65) Prior Publication Data
US 2023/0027786 A1    Jan. 26, 2023

(51) Int. Cl.
*G02B 23/12* (2006.01)
*G02B 3/14* (2006.01)
(Continued)

(52) U.S. Cl.
CPC .............. *G02B 23/12* (2013.01); *G02B 3/14* (2013.01); *G02B 23/145* (2013.01); *G02B 25/001* (2013.01); *G02B 27/0093* (2013.01)

(58) Field of Classification Search
CPC ........ G02B 23/12; G02B 3/14; G02B 23/145; G02B 25/0001; G02B 27/0093
(Continued)

(56) References Cited

U.S. PATENT DOCUMENTS

| 9,279,975 B2 | 3/2016 | Berlips |
| 9,557,553 B2 | 1/2017 | Szapiel |

(Continued)

FOREIGN PATENT DOCUMENTS

FR    3040796 A1 *  3/2017  ......... G02B 27/0101

OTHER PUBLICATIONS

FR-3040796-A1—English translation—FIESS—Mar. 2017.*
(Continued)

*Primary Examiner* — Sharrief I Broome
(74) *Attorney, Agent, or Firm* — NORTON ROSE FULBRIGHT CANADA LLP (57) ABSTRACT

An optical sighting device includes an eyepiece positioned to receive optical radiation along an optical axis to produce a real exit pupil located remote from the eyepiece. The real exit pupil is positioned at an eye relief distance from the eyepiece along the optical axis. A digital signal processor determines an axial distance from the eyepiece to an eye positioned proximate the real exit pupil along the optical axis. An aperture stop is centered along the optical axis to direct the optical radiation in a direction of the eyepiece. The eye relief distance is based at least in part on a position of the aperture stop along the optical axis. The optical sighting device further includes an eye relief actuator to translate the aperture stop along the optical axis to null a spatial offset between the eye relief distance and the axial distance to the eye.

19 Claims, 7 Drawing Sheets

(51) Int. Cl.
*G02B 23/00* (2006.01)
*G02B 25/00* (2006.01)
*G02B 27/00* (2006.01)

(58) Field of Classification Search
USPC .......................................................... 359/399
See application file for complete search history.

(56) References Cited

U.S. PATENT DOCUMENTS

| | | | |
|---|---|---|---|
| 2007/0201847 A1* | 8/2007 | Lei | G03B 13/10 396/51 |
| 2007/0253057 A1 | 11/2007 | Potsaid et al. | |
| 2015/0103155 A1* | 4/2015 | Szapiel | H04N 23/60 348/78 |
| 2016/0116254 A1* | 4/2016 | Jahromi | F41G 11/00 42/122 |
| 2016/0252720 A1* | 9/2016 | Greener | G02B 23/02 359/407 |
| 2018/0285620 A1 | 10/2018 | Wagner et al. | |
| 2020/0018946 A1* | 1/2020 | Takemoto | G02B 15/14 |

OTHER PUBLICATIONS

International Search Report and Written Opinion in corresponding International Patent Application No. PCT/CA2019/000158 dated Jul. 9, 2020.

* cited by examiner

OPTICAL SIGHTING DEVICES AND METHODS FOR AUTOMATICALLY ADJUSTING AN EYEBOX

CROSS-REFERENCE TO RELATED APPLICATIONS

This application is a U.S. National Phase Application and claims the benefit of priority under 35 U.S.C. § 371 of International (PCT) Patent Application Serial No. PCT/CA2019/000158, titled OPTICAL SIGHTING DEVICES AND METHODS FOR AUTOMATICALLY ADJUSTING AN EYEBOX, filed Nov. 21, 2019, which is hereby incorporated herein by reference in its entireties for all purposes.

BACKGROUND

Magnified telescopic sights, such as rifle scopes and spotting scopes, for example, frequently suffer from very small exit pupil size, often in terms of both diameter (size in the dimensions measured orthogonal to the primary optical axis of the sight) and depth (size measured in the dimension along the primary optical axis). As a result, it can be very difficult for an operator to keep his/her eye within the effective eyebox of the device. Very small, sub-millimeter movements of the operator's head can have a significant impact. Therefore, even operators who are trained to work with instruments having tight eyeboxes, such as snipers or competitive sports shooters, for example, may be not able to keep their heads sufficiently stable, particularly under such circumstances as intensive physical effort (for example, after a fast run), stress, or exhaustion. In addition, it may take several seconds to achieve a proper match between the operator's eye and the eyebox of the device. Movement of the eye out of the eyebox, in any dimension, can result in severe vignetting or total loss of the observed image.

Figure 1A:
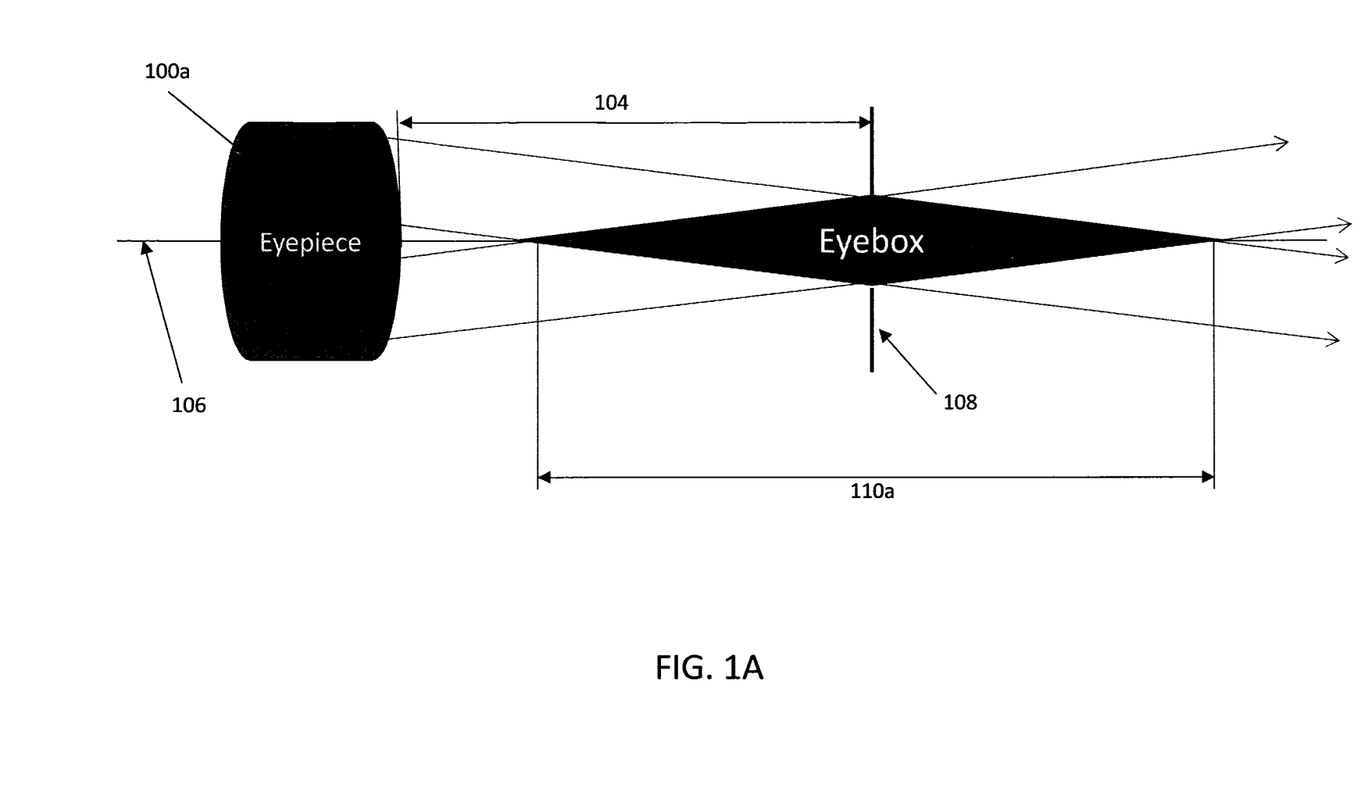
FIG. 1A is an illustration of an example of an eyepiece and a corresponding eyebox, as discussed herein.
Figure 1B:
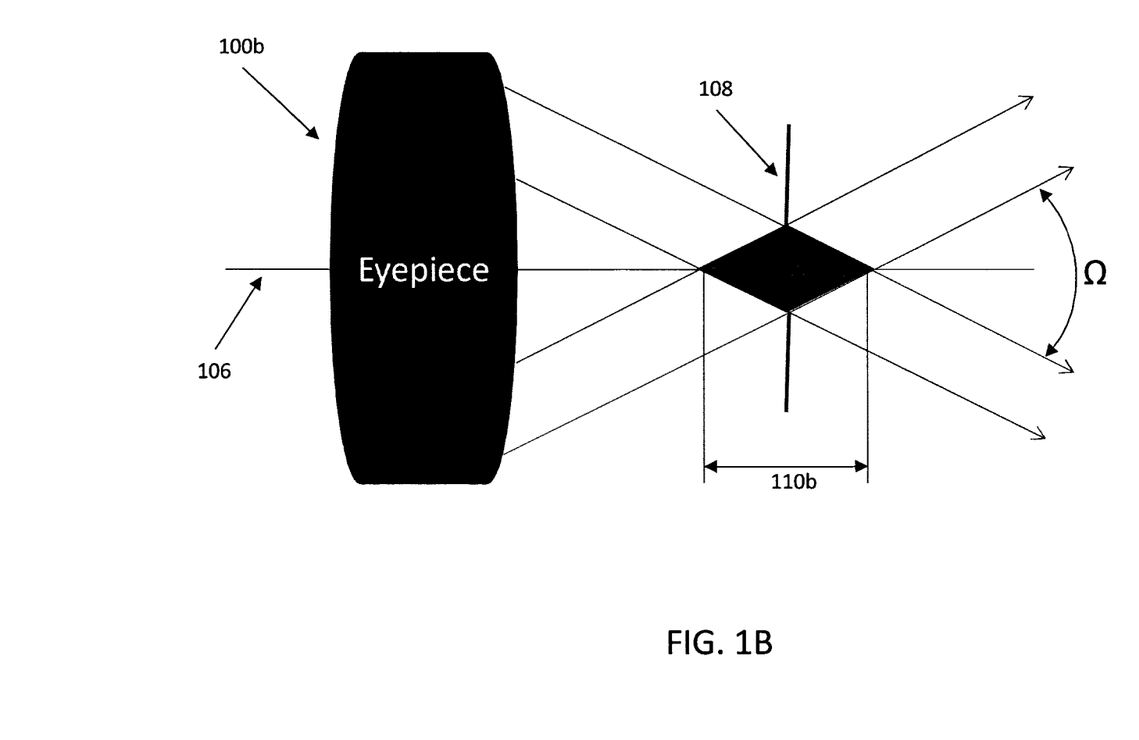
FIG. 1B is an illustration of another example of an eyepiece and a corresponding eyebox, as discussed herein.

Referring to FIGS. 1A and 1B, there are illustrated examples of an eyepiece of an optical system (e.g., a telescope) and a corresponding eyebox to illustrate principles discussed herein. In each case, the eyepiece 100a, 100b produces a corresponding eyebox 102a, 102b, respectively. The eye relief 104 is defined as the distance along the primary optical axis 106 measured from the vertex of last optical surface of the eyepiece 100a, 100b to the plane of exit pupil 108 of the telescope. As illustrated in FIGS. 1A and 1B, each eyebox 102a, 102b has a corresponding eyebox depth 110a, 110b along the optical axis 106. For telescopes with a large apparent field of view (shown as angle Ω in FIG. 1B), the eyebox depth can be small, particularly when the magnification is large. Thus, as shown relatively in FIGS. 1A and 1B, for a telescope having a relatively smaller apparent field of view, the eyepiece 100a may produce an eyebox 102a having a longer eyebox depth 110a than a telescope having a relatively larger apparent field of view in which the eyepiece 100b may produce an eyebox 102b having a shorter eyebox depth 110b.

U.S. Pat. No. 9,557,553 discloses examples of systems and methods for automatically adjusting the size and/or positioning of the eyebox 102a, 102b in the dimensions transverse (orthogonal) to the optical axis 106. The terminology used herein refers to those dimensions (transverse or perpendicular to the optical axis 106) as X and Y, and to the axial dimension, along the optical axis 106, as Z; however, this terminology is not intended to limit to the devices discussed herein to any particular spatial positioning. U.S. Pat. No. 9,557,553 discloses methods and apparatus for automatically expanding the eyebox 120a, 102b of an optical device in the lateral dimensions X and Y by tracking the movement of an operator's eye, and automatically repositioning the exit pupil 108 of the optical sighting device to follow the movement of the eye. However, only the lateral movements of the eye are detected and compensated for by lateral relocation (in X and Y) of the exit pupil 108.

SUMMARY OF THE INVENTION

As discussed above, U.S. Pat. No. 9,557,553 discloses systems and methods for adjusting the eyebox 102a, 102b by moving the exit pupil 108 in X and Y transverse directions perpendicular to the optical axis 106 of the telescope (Z axis). However, the eye relief 104 does not change. This can work well if the axial depth 110a, 110b of the eyebox 102a, 102b is sufficiently large. However, as illustrated in FIG. 1B and discussed above, in certain cases, such as where the telescope has a wide apparent field of view and optionally high magnification, the eyebox depth 110b can be small. Accordingly, aspects and embodiments provide a solution that addresses "black-out" effect (loss of the observed image) due to axial movement (in the Z dimension) of the operator's eye.

As discussed further below, various aspects and examples described herein provide optical sighting devices and methods for automatically adjusting an eyebox depth to substantially align a real exit pupil of an optical sighting device to a user's eye. In various examples, the described optical sighting devices may include a range-finder to measure a range to the user's eye, and control circuitry to determine an axial distance between an eyepiece and the eye, based at least on the measured range. To substantially align the real exit pupil and the eye, the control circuitry may translate an aperture stop, or adjust one or more focus settings of a varifocal lens, to null a spatial offset between an eye relief of the optical sighting device and the axial distance to the eye. Accordingly, various examples of the optical sighting devices and methods described herein may continuously translate the real exit pupil to track the location of the eye responsive to continuous movement of the location of the eye along the optical axis of the optical sighting device.

One aspect of the present disclosure is directed to an optical sighting device comprising an eyepiece positioned to receive optical radiation along an optical axis and configured to produce a real exit pupil located remote from the eyepiece. The real exit pupil is positioned at an eye relief distance from the eyepiece along the optical axis. The optical sighting device further comprises a digital signal processor configured to determine an axial distance from the eyepiece to an eye positioned proximate the real exit pupil along the optical axis. An aperture stop is centered along the optical axis to direct the optical radiation in a direction of the eyepiece. The eye relief distance is based at least in part on a position of the aperture stop along the optical axis. The optical sighting device further comprises an eye relief actuator coupled to at least the aperture stop and the digital signal processor. The eye relief actuator is configured to translate the aperture stop along the optical axis to null a spatial offset between the eye relief distance and the axial distance to the eye.

Embodiments of the optical sighting device further may include configuring the eye relief actuator to translate the aperture stop along the optical axis to align the real exit pupil with the eye along the optical axis. The eye relief actuator further may be configured to continuously translate the aperture stop along the optical axis to move the real exit pupil to track a location of the eye along the optical axis responsive to continuous movement of the location of the eye. The optical sighting device further may include a range-finder positioned to measure a range from the range-finder to the eye, with the axial distance to the eye being determined based at least in part on the range from the range-finder to the eye. The optical sighting device further may include an infrared illuminator positioned to direct infrared electromagnetic radiation onto the eye. The range-finder may be configured to measure the range from the range-finder to the eye based on reflections of the infrared electromagnetic radiation from the eye. The optical sighting device further may include an encoder positioned to detect the position of the aperture stop. The digital signal processor further may be configured to calculate the eye relief distance based at least in part on the position of the aperture stop. The optical sighting device further may include front optics configured to receive the optical radiation from a viewed scene and to direct the optical radiation via the aperture stop to the eyepiece. The optical sighting device may be a telescopic sight including a reticle, with the reticle being positioned between the aperture stop and the eyepiece to maintain a relationship between the reticle and an observed image during relocation of the real exit pupil.

Another aspect of the disclosure is directed to an optical sighting device comprising an eyepiece positioned to receive optical radiation along an optical axis and configured to produce a real exit pupil located remote from the eyepiece. The real exit pupil is positioned at an eye relief distance from the eyepiece along the optical axis. The optical sighting device further comprises a digital signal processor configured to determine an axial distance from the eyepiece to an eye positioned proximate the real exit pupil along the optical axis and an aperture stop centered along the optical axis to direct the optical radiation in a direction of the eyepiece. The eye relief distance is based at least in part on a position of the aperture stop along the optical axis. The optical sighting device further comprising a varifocal lens centered along the optical axis and configured to direct the optical radiation in a direction of the eyepiece, with the eye relief distance being based at least in part on a focus setting of the varifocal lens. The optical sighting device further comprises an eye relief actuator coupled to at least the varifocal lens and the digital signal processor. The eye relief actuator is configured to control the focus setting of the varifocal lens to null a spatial offset between the eye relief distance and the axial distance to the eye.

Embodiments of the optical sighting device further may include configuring the eye relief actuator to control the focus setting of the varifocal lens to align the real exit pupil with the eye along the optical axis. The eye relief actuator further may be configured to continuously control the focus setting of the varifocal lens to move the real exit pupil to track a location of the eye along the optical axis responsive to continuous movement of the location of the eye. The optical sighting device further may include a range-finder positioned to measure a range from the range-finder to the eye, with the axial distance to the eye being determined based at least in part on the range from the range-finder to the eye. The optical sighting device further may include an infrared illuminator positioned to direct infrared electromagnetic radiation onto the eye. The range-finder may be configured to measure the range from the range-finder to the eye based on reflections of the infrared electromagnetic radiation from the eye.

Yet another aspect of the disclosure is directed to a method of automatically adjusting an eyebox of an optical sighting device. In one embodiment, the method comprises: receiving optical radiation along an optical axis at an eyepiece to produce a real exit pupil located remote from the eyepiece, the real exit pupil being positioned at an eye relief distance from the eyepiece along the optical axis; measuring a range from a range-finder to an eye positioned proximate the real exit pupil and along the optical axis; determining an axial distance from the eyepiece to the eye based at least in part on the range from the range-finder to the eye; determining a spatial offset between the axial distance to the eye and the eye relief distance along the optical axis; and reducing the spatial offset between the eye relief distance and the axial distance to the eye to substantially align the eye and the real exit pupil along the optical axis.

Embodiments of the method further may include reducing the offset between the eye relief distance and the axial distance to the eye by continuously moving the real exit pupil to track a location of the eye along the optical axis responsive to continuous movement of the location of the eye. Reducing the spatial offset between the eye relief distance and the axial distance to the eye may include controlling a focus setting of a varifocal lens to adjust a focal length of the optical sighting device. Reducing the spatial offset between the eye relief distance and the axial distance to the eye may include translating an aperture stop of the optical sighting device along the optical axis. The method further may include detecting a position of the aperture stop with an encoder positioned proximate the aperture stop, and calculating the eye relief distance based at least in part on the position of the aperture stop. Measuring the range to the eye may include triangulating a location of the eye with a plurality of cameras. The method further may include directing infrared electromagnetic radiation onto the eye. Measuring the range from the range-finder to the eye may include measuring the range based on reflections of the infrared electromagnetic radiation from the eye.

Still other aspects, embodiments, and advantages of these exemplary aspects and examples are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and examples described herein may also include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Various aspects and examples described herein provide optical sighting devices and methods for automatically adjusting the eye relief, or perceived eyebox depth, to accommodate movement of a user's eye in the axial direction along an optical axis of the optical sighting device. Examples of optical sighting devices in which examples of the described systems may be incorporated may include, but are not limited to, telescopic sights (such as rifle scopes or spotting scopes, for example), microscopes, endoscopes, or other optical devices that have an eyepiece that produces a remotely located real exit pupil for use by a human operator. As discussed above, in many instances, the size of the eyebox can be very small, and as a result, it can be difficult for the user to maintain his/her eye precisely aligned with the small eyebox. As also discussed above, U.S. Pat. No. 9,557,553 discloses systems and methods to automatically compensate for lateral movement (in X and Y) of the user's eye by expanding the diameter of the eyebox in the X and/or Y dimensions, or by laterally repositioning in the exit pupil (and therefore the eyebox) in the X and/or Y dimensions. However, with such lateral adjustments, the eye relief does not change, and there may be no ability to determine or compensate for axial movement of the user's eye.

Aspects and embodiments provide methods apparatus for automatically adjusting the eye relief of an optical sighting device. According to certain embodiments, automatic eye relief adjustment is achieved by automatically moving the exit pupil along the optical axis (Z dimension)—as the exit pupil moves axially, the eye relief changes accordingly. There are numerous circumstances and applications in which automatically changing the eye relief alone may be very beneficial. For example, in certain instances, a shooter may be unable to assume perfect cheekweld position due to lack of time, external danger, or a sudden movement of the head, for example, and therefore the eye position may be away and at much larger distance than the eye relief, which may result in severe vignetting or even total loss of the entire imagery of the target. In many zoom scopes, changes in the magnification of the scope result in unwanted changes in the eye relief, such that the shooter may have to re-adjust cheekweld position, which requires both attention and time. Further, automatic adjustment of the eye relief may be beneficial when the Z position of a scope must change, for example, as a result of the addition of an accessory or exchange of a part. In addition, in scopes where the axial depth of the eyebox is very small, natural movements of shooter's head may cause observation discomfort, particularly at high magnifications such as 20X zoom or more, which may be alleviated through automatic adjustment of the eye relief in accord with aspects and embodiments disclosed herein.

Accordingly, various aspects and examples described herein provide optical sighting devices and methods for automatically adjusting an eyebox depth to substantially align the real exit pupil of an optical sighting device with a user's eye along an optical axis (i.e., in an axial direction) of the optical sighting device. In many examples, the described optical sighting devices are configured to track the axial movement of an operator's eye, and automatically cause the eyebox, including the exit pupil, to follow the movement of the eye. Thus, the described optical sighting devices provide the perception of an expanded eyebox depth by following the spatial movement of the eye in the axial direction. Accordingly, the perception and benefits of an expanded eyebox may be created without requiring significant changes to the optics of the optical sighting device, and substantially without affecting the size of the entrance pupil, and magnification of thereof. In certain examples, the automatic eye relief adjustment is one-dimensional. In such cases, the perception of elongated axial depth of the eyebox is created, with no significant impact on the transverse size of the eyebox and without creating the perception of a larger diameter of the exit pupil that is described in U.S. Pat. No. 9,557,553. However, in other examples, the concept of automatic eye relief adjustment, and changes to the perceived depth of the eyebox in the Z dimension can be combined with the transverse adjustment (in X and/or Y) techniques disclosed in U.S. Pat. No. 9,557,553 to produce a three-dimensional automatic eyebox adjustment system and method.

It is to be appreciated that embodiments of the systems and methods discussed herein are not limited in application to the details of construction and the arrangement of components set forth in the following description or illustrated in the accompanying drawings. The systems and methods are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, vertical and horizontal, and cartesian coordinates are intended for convenience of description, not to limit the present systems and methods or their components to any one positional or spatial orientation.

Figure 2:
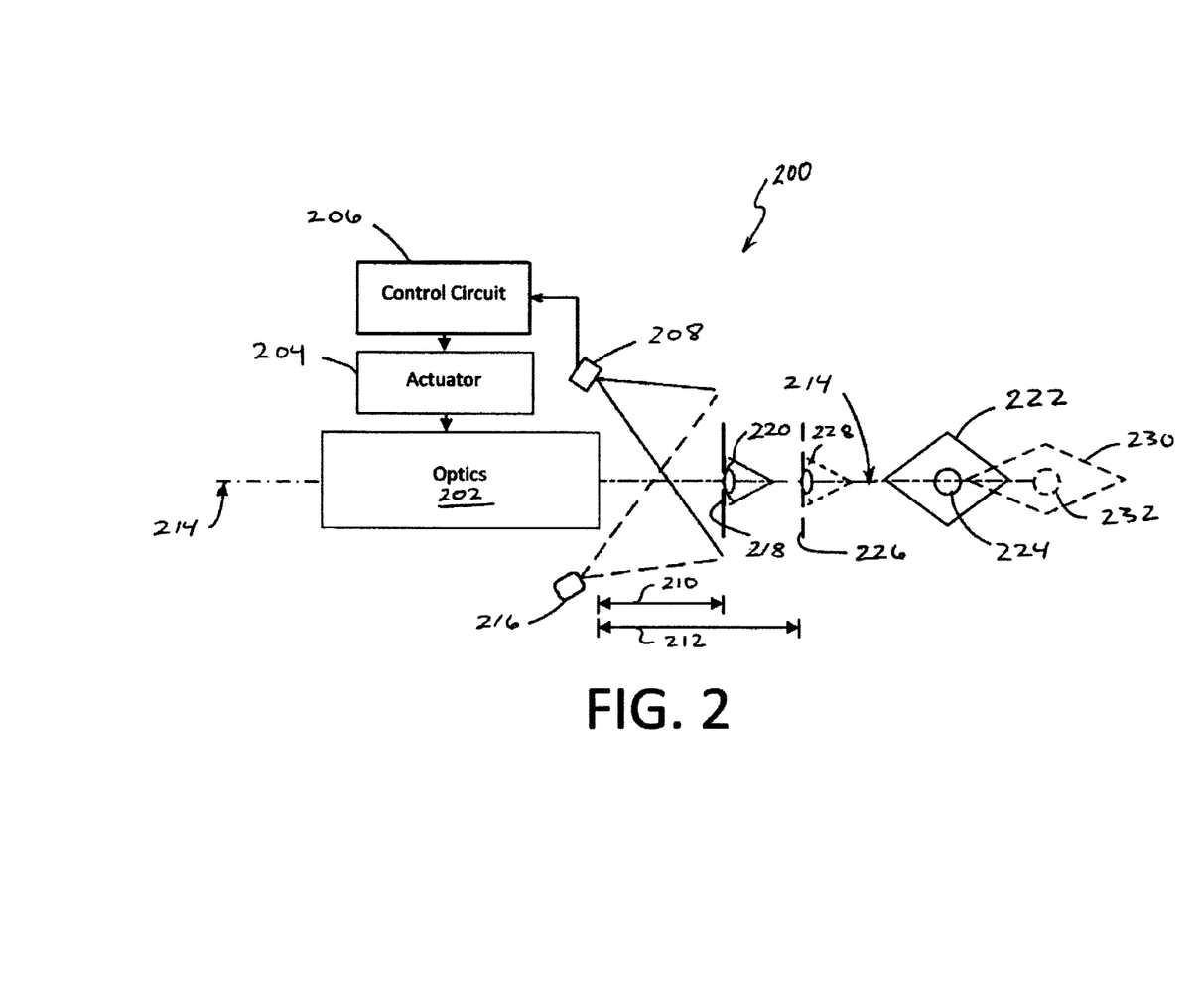
FIG. 2 is a block diagram of an optical sighting device according to various examples described herein.

FIG. 2 illustrates a block diagram of an optical sighting device 200 that automatically expands the eyebox of an optical sighting device in an axial direction along the primary optical axis of the device. The described optical sighting device 200 may be implemented in any type of optical sighting device or telescope, including, but not limited to, rifle or other weapon scopes or sights, spotting scopes, microscopes, and endoscopes. As illustrated in FIG. 2, the optical sighting device 200 includes one or more optics 202 that receive optical radiation along an optical axis 214 and direct and focus the incident optical radiation along the optical axis 214 towards a user's eye to allow the user to view an imaged scene. As shown in FIG. 2, the one or more optics 202 may produce a real exit pupil 218 located remote from the one or more optics 202. For example, the one or more optics 202 may include one or more mirrors and/or lenses that form a telescopic sight (such as rifle scope or spotting scope), a microscope, an endoscope, or other sighting device that produces a remotely located real exit pupil. The optical sighting device 200 is further illustrated as including a control circuit 206, an eye relief actuator 204, a range-finder 208, and a source of illumination 216. Particular examples of the control circuit 206, the range-finder 208, and the eye relief actuator 204, and examples of the interaction between the control circuit 206, the range finder 208, and the eye relief actuator 204, are further described below with reference to FIGS. 3 and 4.

In various examples, the control circuit 206 is configured to control the eye relief actuator 204 to adjust one or more characteristics of the one or more optics 202 to compensate for movement of the eye along the optical axis 214 (i.e., in an axial direction). As discussed herein, the distance along the optical axis 214 between the location of the eye and an eyepiece of the one or more optics 202 is referred to as the axial distance. As discussed above, as used herein, the axial direction corresponds to the Z dimension in cartesian coordinates; however, the use of this terminology is not intended to limit the devices disclosed herein to any particular spatial orientation. As the eye moves along the optical axis 214, and away from the real exit pupil 218 of the optical sighting device (e.g., in the positive Z direction or in the negative Z direction), the optical sighting device 200 moves the eyebox (including the real exit pupil 218) in the same direction to follow the movement of the eye.

For instance, FIG. 2 illustrates a first location 220 of the eye at a first axial distance 210, and a second location 228 of the eye at a second axial distance 212. Angular area 222 represents the original location of the eyebox of the optical sighting device 200, and circle 224 represents the original location of the eye relative to the eyebox. As the eye moves from the first location 220 to the second location 228, the optical sighting device 200 repositions the real exit pupil 218 to align with the eye at the second location 228. The repositioned real exit pupil is illustrated relative to the second location 228 of the eye by line 226. Angular area 230 represents the adjusted location (e.g., translated location) of the eyebox, and circle 232 represents the second location of the eye relative to the eyebox. As discussed, the angular area 230 is created by moving the real exit pupil 218 to follow the movement of the eye.

Thus, through provision of the translated eyebox, the user of the optical sighting device 200 may not experience vignetting or loss of the imaged field of view even when moving his or her head and/or hands. In contrast, conventionally, such movement of the user's head and/or hands would result in a mismatch between the location of the eye and the location of the real exit pupil. Such an offset typically results in vignetting and/or loss of the imaged field of view. In the described manner, the eyebox is "delivered" to the current location of the eye, as illustrated in FIG. 2. That is, the real exit pupil 218 continuously tracks movement of the eye so that visual contact with the viewed image of the scene is not interrupted. Control of movement of the eyebox may be affected using either of two approaches, as discussed in more detail below with reference to FIGS. 3 and 4. In a first implementation, the position of an aperture stop centered along the optical axis 214 is translated along the optical axis 214 by the eye relief actuator 204 to null a spatial offset between the eye relief and the axial distance to the eye. In a second implementation, the eye relief actuator 204 is configured to control a focus setting of a varifocal lens to null the spatial offset between the eye relief and the axial distance to the eye. While described in certain examples as separate implementations, it is appreciated that in other examples translation of an aperture stop may be combined with adjustment of a varifocal lens to null the spatial offset between the eye relief and the axial distance to the eye. In various examples, the eye relief actuator 204 may be controlled by the control circuit 206 based at least on feedback from the range-finder 208.

Figure 3:
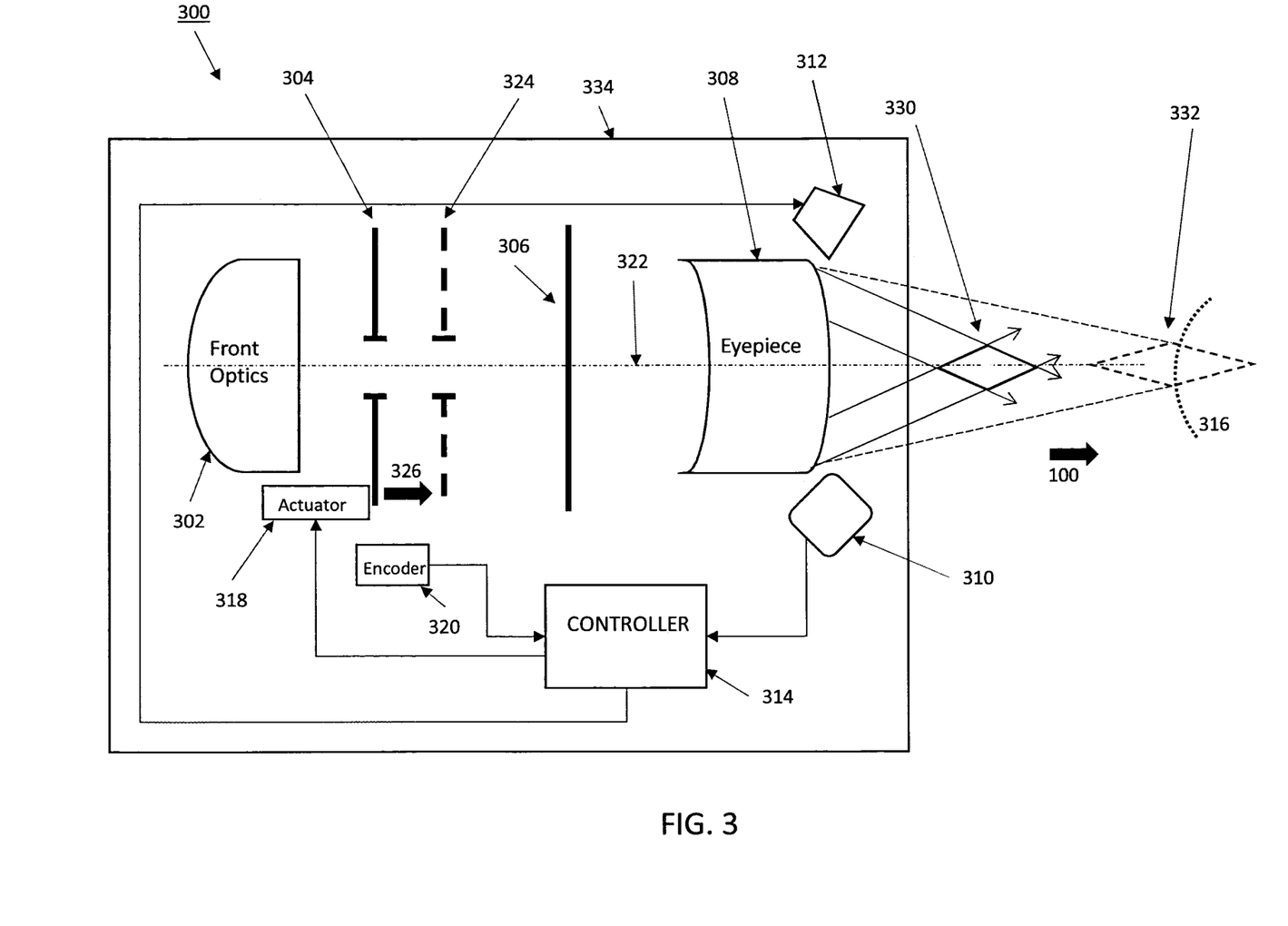
FIG. 3 is detailed example of an optical sighting device, according to various examples described herein.

Referring to FIG. 3, illustrated is a detailed example of an optical sighting device 300, which in one example may be the optical sighting device 200 illustrated in FIG. 2. Accordingly, the optical sighting device 300 may include many of the same components as the optical sighting device 200 illustrated in FIG. 2, such as the control circuit 206, the actuator 204, and the one or more optics 202. In FIG. 3, the optical sighting device 300 is shown as including front optics 302, an aperture stop 304, an intermediate focal plane 306, and an eyepiece 308. These components may together form the one or more optics 202 illustrated in FIG. 2. As further illustrated, the optical sighting device 300 may include a control circuit 314, an eye relief actuator 318, an encoder 320, and a range-finder 310 including a range sensor and optionally an illumination source 312. In various examples, components of the optical sighting device 300 may be integrated within a housing, such as housing 334, which may be the housing of a rifle scope, spotting scope, microscope, or endoscope, to name a few examples.

In various examples, the front optics 302 are positioned along an optical axis 322 to receive optical radiation and direct the optical radiation via the aperture stop 304 toward the eyepiece 308. As discussed herein, the optical radiation may include any visible light. However, in other examples, the optical radiation may include other spectral ranges of non-ionizing electromagnetic radiation. The front optics 302 may include one or more mirrors or lenses (e.g., illustrated as one or more lenses), such as an objective lens group, that collects and focuses received optical radiation at the intermediate focal plane 306. In some examples, the front optics 302 may include one or more relay lenses. The aperture stop 304 is centered along the optical axis 322 to receive the optical radiation from the front lens group 302, and direct the optical radiation in a direction of the eyepiece 308 along the optical axis 322. As shown, the aperture stop 304 is interposed between the front optics 302 and the intermediate focal plane 306 and may include a central region through which the optical radiation passes. While shown as centered along the optical axis 322, in various other examples, the central region of the aperture stop 304 may be arranged in a different position. In this manner, the aperture stop 304 limits the amount of optical radiation that is directed to the intermediate focal plane 306.

As illustrated in FIG. 3, the eyepiece 308 is centered along the optical axis 322 and positioned to receive the optical radiation from the aperture stop 304. While illustrated as directly receiving the optical radiation from the aperture stop 304, in various other examples, the optical sighting device 300 may include additional optics interposed in front and/or behind the intermediate focal plane 306 and the eyepiece 308. In particular, the specific additional optics interposed in front and/or behind the intermediate focal plane 306 and the eyepiece 308 may depend on the particular application of the optical sighting device 300. For instance, the optical sighting device 300 may include a prismatic erector or a lens-based erector for sighting formation. Based on the received optical radiation, the eyepiece 308 produces a real exit pupil located remote (e.g., at a distance) from the eyepiece 308. As discussed above, the eye relief is defined as the distance along the optical axis 322 measured from the vertex of last optical surface of the eyepiece 308 to the plane of exit pupil. Placement of a user's eye 316 proximate the real exit pupil permits the user to view a scene imaged by the optical sighting device 300. While shown in FIG. 3 as being linear for the purpose of illustration, it is appreciated that in various other examples, the optical axis 322 of the optical sighting device 300 may instead be non-linear, for instance, due to one or more folding mirrors positioned along the optical axis 322.

As illustrated in FIG. 3, the eye relief actuator 318, the encoder 320, the range sensor 310 and the illumination source 312 are coupled to the control circuit 314, which in certain examples, may be an integrated circuit including a digital signal processor, for example. In various examples, the control circuit 314 is configured to determine the axial distance between the eyepiece 308 and the user's eye 316 along the optical axis 322 using the range-finder 310. While discussed herein as a discrete distance for the purpose of explanation, in various examples, the digital signal processor 316 is configured to continuously (e.g., in real-time) determine the axial distance between the eyepiece 308 and the user's eye 316 as the user's eye 316 moves relative to the eyepiece 308. In this manner, the digital signal processor 316 may "track" the movement of the eye 316 along the optical axis 322.

In various examples, the control circuit 314 may receive one or more range measurements from the range-finder 310 and determine the axial distance to the eye based on the received range measurements. The range-finder 310 may use optical passive range sensing or optical active range sensing techniques to measure the range between the eyepiece 310 and the eye 316. In the case of passive range sensing, the illumination source 112 may be excluded. In the case of active range sensing, the illumination source 312 may be positioned to direct infrared electromagnetic radiation onto the eye 316, optionally under the control of the control circuit 314. For instance, the illumination source 312 may be a LED or miniature semiconductor laser, to name a few examples. Based on reflections of the infrared illumination from the eye 316, the range-finder 310 may measure the range between the eye 316 and the eyepiece 308. In certain examples, it may be necessary only to approximately know the position of the operator's eye or face since the axial depth of the original eyebox 330 may be typically much greater than the size of exit pupil, which by itself is typically at least few millimeters. Accordingly, an axial range estimate from the eyepiece 308 to the operator's head, face, or facial feature(s) (such as the eye 316) may be used for changing the eye relief, as discussed further below. There are several commercially available time-of-flight miniature laser range-finders on a chip, which can be used in the optical system 300 for quick and very precise measurement of the axial distance from the eyepiece 308 to the eye 316. For example, STMicroelectronics (with headquarters in Geneva, Switzerland) provides their FlightSense™ Time-of-Flight miniature VCSEL ranging sensors (e.g., part number VL53L0X), which is eye-safe, robust to ambient light, covers range of up to 2 meters, and is appropriately small and light-weight to be used in the optical system 300. Those skilled in the art will appreciate that a variety of other range-finders 310 may be used.

As discussed above, in certain embodiments, the one-dimensional automatic eye relief adjustment techniques disclosed herein may be combined with the two-dimensional lateral eyebox adjustment techniques disclosed in U.S. Pat. No. 9,557,553 to provide a three-dimensional automatic eyebox adjustment system. As discussed in U.S. Pat. No. 9,557,553, for the lateral eyebox resizing/repositioning techniques disclosed therein, it may be necessary to recognize the iris of the eye 316 and to find fairly precisely the X-Y position of the iris. Accordingly, in such cases, the system may implement multiple cameras for iris recognition and acquisition, and a therefore a triangulation range-finding approach may be employed for the axial measurements as well. Thus, in various examples, the range-finder 310 may include a plurality of cameras (e.g., three cameras) that are each configured to measure a range between the respective camera and the iris of the eye. Based on the collected measurements, the range-finder 310 (or the control circuit 314) may triangulate the location of the iris of the eye 316 along the optical axis 322. In certain other examples, the range-finder 310 may use dual-view triangulation range sensing to determine a range to the iris of the eye 316. In such an example, the range-finder 310 may include a pair of miniature digital cameras (or a single dual-aperture camera). U.S. Pat. No. 9,667,553 discusses in more detail processes that can be used (e.g., by the control circuit 314) to accurately determine the position of the iris of the eye 316 based on the measurements from the range-finder 310 for such examples.

As further illustrated in FIG. 3, the control circuit 314 may be coupled to and in communication with the encoder 320. The encoder 320 measures a position of the aperture stop 304 along the optical axis 322, and provides position information (e.g., in the form of an electrical signal) that is representative of the measured position, to the control circuit 314. For example, the encoder 320 may be a transducer, such as an optical transducer or a magnetic transducer that senses the position of the aperture stop 304 and translates that position to an electrical signal. Based on the received position information, the digital signal processor 316 is configured to determine the eye relief. That is, based on at least the position of the aperture stop 304 along the optical axis 322, the digital signal processor 316 is configured to determine the distance between the eyepiece 308 and the real exit pupil. Based on a known optical prescription for the eyepiece 308, the eye relief relative to the position of the aperture stop 304 may be easily calculated and determined using any commercial optical design software package, as will be appreciated by those skilled in the art. Based on the determined eye relief and the determined axial distance to the eye 316, the control circuit 314 may calculate the difference the eye relief and the axial distance to determine if a spatial offset exists between the real exit pupil and the eye 316. If there is an offset, indicating that the eye 316 is not properly aligned with the original eyebox 330, the control circuit 314 may control the eye relief actuator 318 to adjust the position of the aperture stop 304 to adjust the eye relief so as to reposition the eyebox to align with the eye 316.

In various examples, the eye relief actuator 318 is electrically coupled to the control circuit 314 and to the aperture stop 304, and is controllable (by the control circuit 314) to translate the aperture stop 304 along the optical axis 322. For instance, FIG. 3 illustrates the aperture stop 304 in motion (indicated by arrow 326) from a first location along the optical axis 322 to a second location along the optical axis 322. In FIG. 3, the second location is illustrated in ghost lines 324, and the direction of translation of the aperture stop is indicated by arrow 326. While shown as being translated in a first direction along the optical axis 322 (e.g., the positive Z direction), in various other examples the eye relief actuator 318 may also translate the aperture stop 304 in a substantially opposite second direction along the optical axis 322 (e.g., the negative Z direction). The eye relief actuator 318 may include a mechanical actuator or an electric actuator, to name a few examples. For instance, the eye relief actuator 318 may include an electric motor that converts electrical energy into a mechanical torque to translate the aperture stop 304 along the optical axis 322.

FIG. 3 further illustrates the effect of the translated aperture stop 324 on the eyebox of the optical sighting device 300. As shown, the position of the original eyebox 330 corresponds to the first location of the aperture stop 304. When the aperture stop 304 is translated to the second position 324, the eyebox is similarly translated to produce an axially repositioned eyebox 332 that is aligned with the eye 316. The direction of translation of the eyebox along the optical axis 322 is represented by arrow 328. In this manner, the eye relief actuator 318 is configured to translate the aperture stop 304 along the optical axis 322 to align the real exit pupil with the eye 316. As discussed, in various examples, the user's eye 316 may be in continuous motion. In such an example, the eye relief actuator 318 is configured to dynamically translate the aperture stop 304 along the optical axis 322 to move the real exit pupil to track a location of the eye 316 along the optical axis 322. Thus, the described optical sighting device 300 provides the perception of an expanded eyebox depth by following the spatial movement of the eye 316 in the axial direction.

Figure 4:
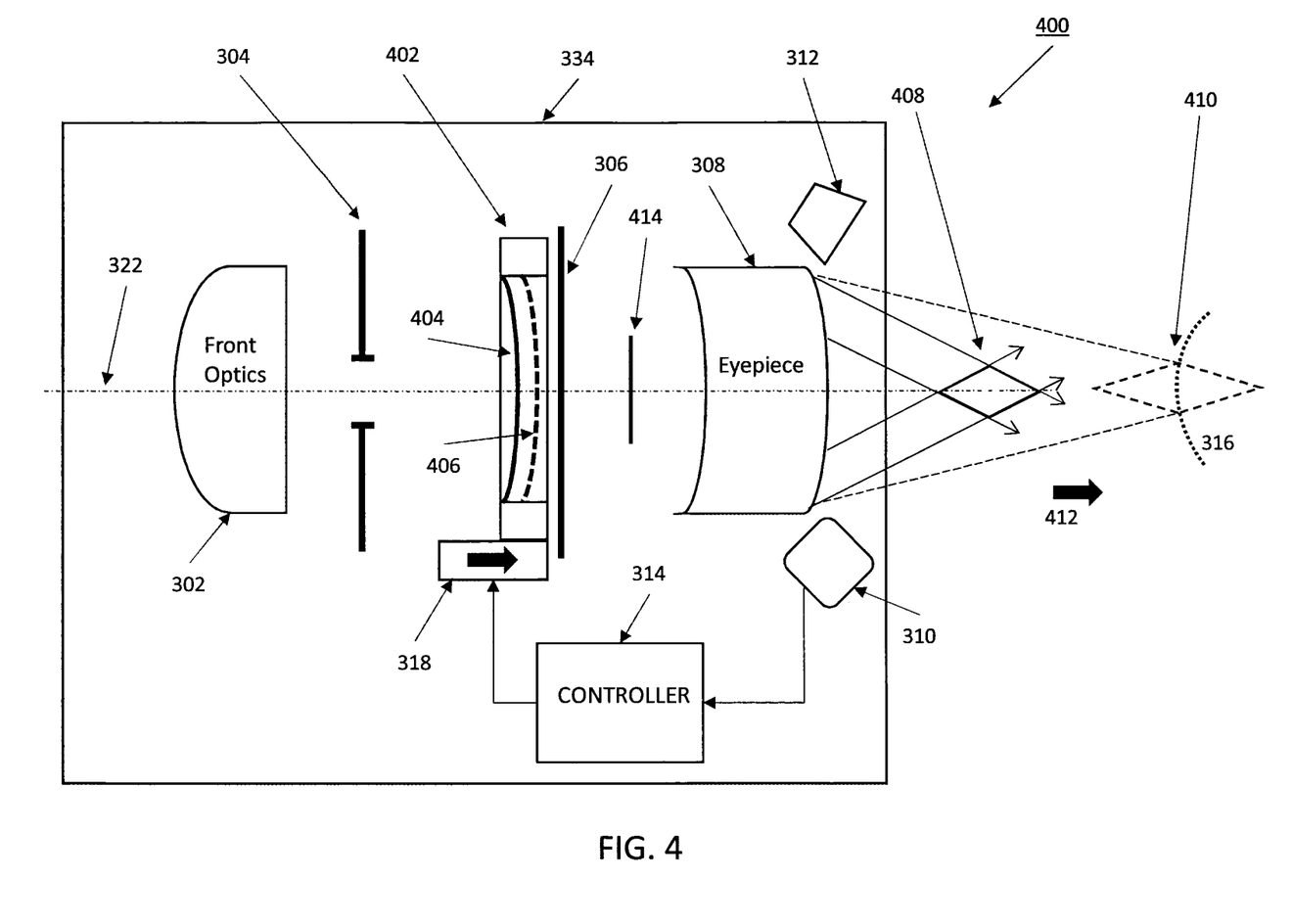
FIG. 4 is another detailed example of an optical sighting device, according to various examples described herein.

FIG. 4 illustrates another detailed example of an optical sighting device 400, which in one example may be the optical sighting device 200 discussed above with reference to FIG. 2. The optical sighting device 400 may include various components that are the same or similar to those in the optical sighting system 300 discussed above with reference to FIG. 3. However, in contrast to the arrangement described above with reference to FIG. 3, in the system 400 of FIG. 4, the aperture stop 304 is positioned at a fixed location, and the control circuit 314 is configured to null a spatial offset between the eye relief and an axial distance to the eye 316 by controlling the eye relief actuator 318 to adjust a focus setting of a varifocal lens 402.

As illustrated in FIG. 4, the varifocal lens 402 is positioned along the optical axis 422 and interposed between the aperture stop 304 and the intermediate focal plane 306, but it can be also interposed between the intermediate focal plane 306 and the eyepiece 308. The varifocal lens 402 is a lens that has a variable focal length, and that may be controlled by adjusting a focus setting thereof. As discussed herein, the "focus setting" of the varifocal lens 402 refers to the setting which specifies the focal length of the varifocal lens 402. Accordingly, controlling, adjusting, or varying the focus setting of the varifocal lens 402 results in an increase or decrease in the variable focal length. While the varifocal lens 402 may be implemented by various adjustable lenses, in one example the varifocal lens 402 is a liquid lens. In one example, the varifocal lens 402 is an adaptive polymer lens. An adaptive polymer lens includes one or more flexible membranes having a fluid dispersed thereabout. The focus setting of the adaptive polymer lens may be adjusted by applying a compression force (e.g., via the eye relief actuator 318) to the one more flexible membranes to adjust a spatial profile thereof. For instance, a linear compression may be applied by the eye relief actuator 318 to adjust a radius of curvature of the one or more flexible membranes. In various embodiments, the varifocal lens 402, the adaptive polymer lens in this example, is in electrical communication with the eye relief actuator 318 and adapted to adjust the focus setting responsive to receiving one or more commands from the control circuit 314 at the eye relief actuator 318.

In various examples, the control circuit 414 may store (or receive) the current focus setting of the varifocal lens 402 and determine the current eye relief based on the current focus setting. As discussed above, the control circuit 314 may determine the axial position of the eye 316 based on measurements from the range-finder 310. Based on the determined eye relief and the determined axial distance to the eye 316, the control circuit 314 may calculate the difference the eye relief and the axial distance to determine if a spatial offset exists between the real exit pupil and the eye 316. If there is an offset, indicating that the eye 316 is not properly aligned with the original eyebox 330, the control circuit 314 may control the eye relief actuator 318 to change the focal setting of the varifocal lens 402 to adjust the eye relief so as to reposition the eyebox to align with the eye 316 (as shown in FIG. 4, the axially repositioned eyebox 332 is aligned with, or overlaps, the eye 316).

In various examples, the eye relief actuator 318 is electrically coupled to the control circuit 414 and to the varifocal lens 402, and is controllable to adjust the focus setting of the varifocal lens 402 to align the real exit pupil with the eye 316 along the optical axis 422. For instance, FIG. 4 illustrates adjustment of the varifocal lens 402 from a first focus setting to a second focus setting. In particular, the first focus setting corresponds to a first radius of curvature 404 and the second focus setting corresponds to a second, different, radius of curvature 406 of the varifocal lens 402.

FIG. 4 further illustrates the effect of the adjusted focus setting of the varifocal lens 402 on the eyebox of the optical sighting device 400. The first focus setting (first radius of curvature 404) produces the original eyebox 408 at a first location along the optical axis 322, and the second focus setting (second radius of curvature 406) produces an axially repositioned eyebox 410 at a second location along the optical axis, as shown. The direction of translation of the eyebox along the optical axis 422 is represented by arrow 412. In this manner, the eye relief actuator 318 is configured to adjust the focus setting of the varifocal lens 402 to reposition the eyebox and align the real exit pupil with the eye 316. As discussed, in various examples, the user's eye 316 may be in continuous motion. In such an example, the eye relief actuator 318, under control of the control circuit 314, is configured to dynamically adjust the focus setting of the varifocal lens 402 to move the real exit pupil to track a location of the eye 316 along the optical axis 422. Thus, the described optical sighting device 400 provides the perception of an expanded eyebox depth by following the spatial movement of the eye 316 in the axial direction.

As discussed above, in various examples the optical sighting device 300 described with reference to FIG. 3 and the optical sighting device 400 described with reference to FIG. 4 may be a telescopic sight. In such an example, the telescopic sight may include a reticule. One example of a reticule 414 is illustrated in FIG. 4. As shown in FIG. 4, the reticule (or its real image) 414 may be positioned and centered along the optical axis 322, and positioned in front (or behind) the intermediate focal plane 306 and in front of the eyepiece 308. Although not shown in FIG. 3, the optical sighting system 300 may include a similar reticule (or its real image) 414 positioned in front or behind the intermediate focal plane 306 and in front of the eyepiece 308. Since both the reticule 414 and the translatable aperture stop 304 are centered on the optical axis 322 and are located in the proximity of the intermediate focal plane 306, action of the translatable aperture stop 304 and the varifocal lens 402 do not change the relationship between the image of the viewed scene and the reticle 414. That is, the optical sighting systems 300, 400 are configured to maintain a relationship between the reticle 414 and an observed image during relocation of the real exit pupil. Accordingly, line of sight and aiming are not disturbed by the action of the translatable aperture stop 304 and the varifocal lens 402.

As also discussed above with reference to FIGS. 2, 3, and 4, various examples of the described optical sighting devices may include a control circuit 314, and in particular, may include a control circuit having a digital signal processor. The control circuit 314 may include a single controller; however, in various other embodiments the control circuit 314 may include a plurality of controllers. The control circuit 314 may include a combination of software-configured elements, signal processing circuitry, application specific integrated circuitry, field-programmable gate arrays, other specialized hardware components, or any combination of various hardware and logic circuitry for performing the various operations and processes discussed herein. In one example, the control circuit 314 includes a processor, data storage, and one or more interfaces (e.g., for system components). The processor may be coupled to the data storage, and the one or more interfaces, and may be configured to perform a series of instructions (e.g., routines) that result in manipulated data stored and retrieved from the data storage. In some examples, the stored and retrieved data may correspond to the range measurements, determined axial distances, determined eye reliefs, and/or focus setting of the varifocal lens.

The instructions stored on the data storage may include executable programs or other code that can be executed by the processor. The instructions may be persistently stored as encoded signals, and the instructions may cause the processor to perform the functions and processes described herein. The data storage may include information that is recorded, on or in, the storage medium, and this information may be processed by the processor during execution of instructions. The data storage includes a computer readable and writeable nonvolatile data storage medium configured to store non-transitory instructions and data. In addition, the data storage includes processor memory that stores data during operation of the processor. One example of a processing system that may be used to implement the control circuit 314 is further described below with reference to FIG. 6.

However, in other examples, the control circuit 314 is a specially-programmed, special-purpose hardware, such as for example, an application-specific integrated circuit (ASIC) configured (e.g., structured) to perform one or more operations disclosed herein, or a field programmable gate array (FPGA) configured (e.g., structured) to perform one or more operations disclosed herein. For instance, the control circuit 314 may include an array of programmable logic blocks (including logical cells) that are specified to perform the various steps, acts, and functions described herein. For instance, the programmable logic blocks may be interconnected with various logic gates. The data storage (e.g., memory) may be incorporated within the ASIC or FPGA, or implemented separate from the ASIC or FPGA. For instance, the memory may be implemented as one or more RAM blocks within the control circuit. In certain other examples, the control circuit may include a non-volatile memory module and/or a combination of non-volatile memory components and volatile memory components. The ASIC or FPGA may be designed in a hardware description language (HDL), such as any language utilized for FPGA development or ASIC development. The control circuit is shown as connected to the other components of the respective optical sighting device by discrete lines in FIGS. 2, 3, and 4. Each of the discrete lines may be an electrical connection (e.g., wired or wireless) that supports the communication of control signals, instructions, and/or data.

Figure 5:
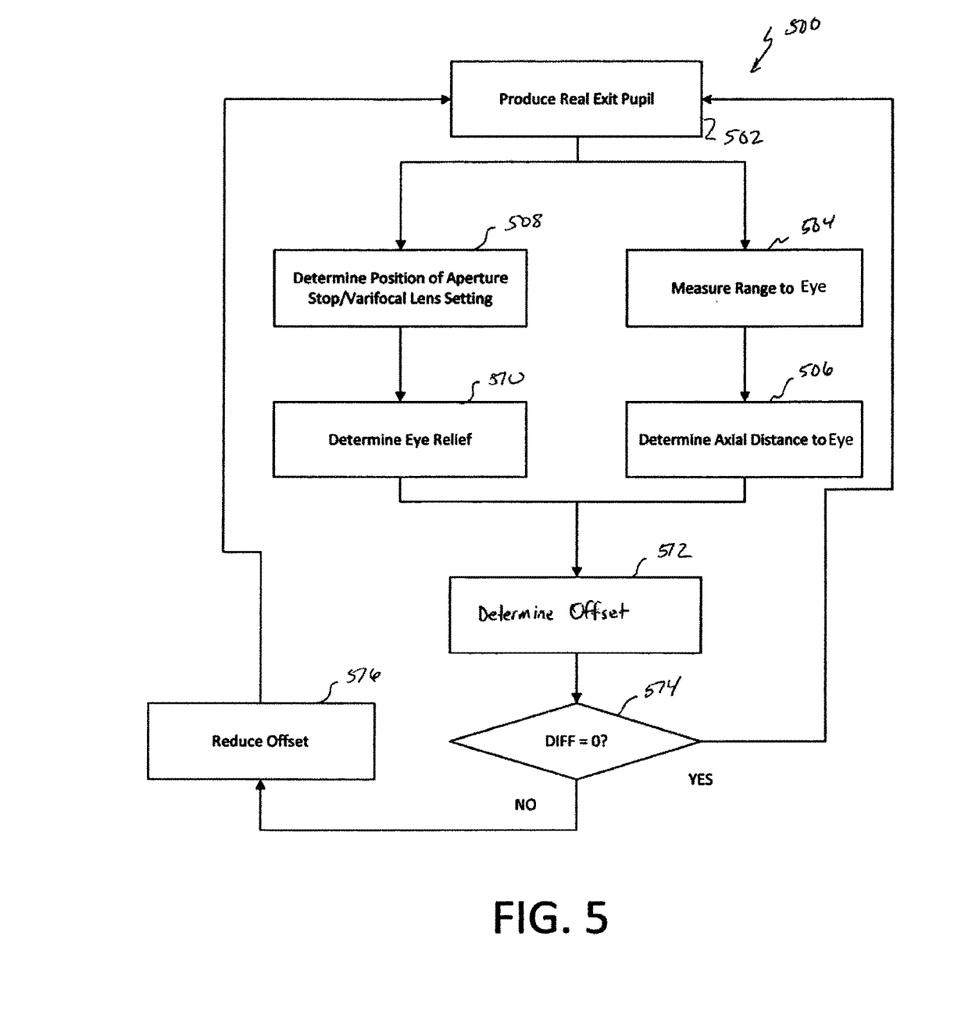
FIG. 5 is a flow diagram of a method for automatically adjusting an eyebox of an optical sighting device, according to various examples described herein.

As discussed above with reference to FIGS. 2-4, various examples perform processes for automatically adjusting an eyebox of an optical sighting device. These processes may be performed by an optical sighting device, such as one of the optical sighting devices illustrated in FIGS. 2-4. FIG. 5 is a flow diagram illustrating one example of a process 500 for automatically adjusting an eyebox of an optical sighting device. The one or more acts of the process 500 described with reference to FIG. 5 may be performed by embodiments of any of the optical sighting device 200 illustrated in FIG. 2, the optical sighting device 300 illustrated in FIG. 3, or the optical sighting device 400 illustrated in FIG. 4, for example.

As illustrated in FIG. 5, the process 500 may include at least the acts of receiving optical radiation and producing a real exit pupil, measuring a range to an eye, determining an axial distance to the eye, determining an eye relief between an eyepiece and the real exit pupil, determining an offset between the eye relief and the axial distance, and reducing the spatial offset.

In act 502 the process may include, receiving optical radiation along the optical axis 322 at the eyepiece 308 to produce a real exit pupil located remote from the eyepiece 308. As discussed above, the distance between the real exit pupil and the eyepiece 308 along the optical axis 322 is the eye relief. In act 504, the process 500 may include measuring a range to the eye 316 using the range-finder 310. Act 504 may include one or more optical passive range sensing or optical active range sensing techniques to measure the range to the eye 316, as discussed above. For active range sensing, act 504 may also include directing electromagnetic radiation (e.g., infrared radiation) onto the eye 316 using the illumination source 312 to illuminate the eye 316. Such acts may be useful when the corresponding optical sighting device 300 is used at nighttime or in other low-light conditions. Based on reflections of the infrared illumination from the eye 316, the range-finder 310 may measure the range to the eye 316, as discussed above.

In act 506, the process 500 may include determining an axial distance from the eyepiece 308 to the eye 316 based at least in part on the measurements obtained by the range-finder 310. For example, the range-finder 310 may be positioned at a fixed location within the optical sighting device 300 relative to the eyepiece 308. Accordingly, act 506 may include determining the axial distance to the eye 316 based on a known positional relationship between the range-finder 310 and the eyepiece 308.

As discussed above, control of movement of the eyebox may be achieved using either of two approaches. These approaches are discussed above with reference to FIGS. 3 and 4, respectively. According to the first approach, which is described with reference to at least FIG. 3, the eye relief actuator 318 translates the aperture stop 304 along the optical axis 322 to null a spatial offset between the eye relief and the axial distance to the eye 316. According to the second approach, which is described with reference to at least FIG. 4, the eye relief actuator 318 controls the focus setting of the varifocal lens 402 to properly adjust its focal length while substantially preserving afocality of the optical sighting device 400 and to null a spatial offset between the eye relief and the axial distance to the eye 316. Accordingly, process 500 may include the act(s) of determining a position of the aperture stop 304 along the optical axis 322, or determining the current focus setting of the varifocal lens 402 (act 508). Such acts may include reading information from a data storage and/or memory, or communicating with one or more components within the optical sighting device 300, 400, such as the encoder 320, the eye relief actuator 318, and/or the varifocal lens 402.

In act 510, the process 500 may include determining the distance between the eyepiece and the real exit pupil, i.e., the eye relief. In the examples in which the optical sighting device includes a translatable aperture stop, act 510 may include determining the eye relief based at least in part on the position of the aperture stop 304. However, in examples in which the optical sighting device includes the varifocal lens 406, act 510 may include determining the eye relief based at least in part on the focus setting of the varifocal lens 406.

In act 512, the process 500 includes detecting a spatial offset between the eye relief and the axial distance to the eye 316. As discussed above, as a result of eye movement or other factors, the user's eye 316 will often be misaligned with a plane of the real exit pupil. This resulting spatial offset can interrupt or negatively impact the user's sight of a viewed image. Accordingly, in act 512, the process 500 may include differencing the eye relief and the axial distance (shown as decision box 514) to determine if a spatial offset exists. If a spatial offset exists, the process 500 includes determining a magnitude of the spatial offset, after which, the process 500 proceeds to act 516. However, if no spatial offset exists, i.e., the eye 316 and the real exit pupil are substantially aligned along the optical axis 322, the process returns to act 500.

In act 516, the process 500 includes reducing the spatial offset between the eye relief and the axial distance to the eye 316 to substantially align the eye and the real exit pupil along the optical axis 322 (i.e., ensure overlap of the eyebox and the eye). In particular examples, act 516 may include continuously moving the real exit pupil to track a location of the eye 316 along the optical axis 322 responsive to continuous movement of the location of the eye. In the examples in which the optical sighting device includes a translatable aperture stop (e.g., as shown in FIG. 3), act 516 may include translating the aperture stop 304 along the optical axis 322 to reduce the spatial offset between the eye relief and the axial distance to the eye 316. In examples in which the optical sighting device includes the varifocal lens 402 (e.g., as shown in FIG. 4), act 516 may include controlling the focus setting of the varifocal lens 402 to adjust the focal length of the optical sighting device 400 to reduce the spatial offset between the eye relief and the axial distance to the eye 316. Once the spatial offset has been reduced, the process 500 returns to act 502. While not explicitly illustrated in FIG. 5, the process 500 may include various other acts and sub-acts to account for actions discussed above with reference to any of FIG. 2, FIG. 3, or FIG. 4.

Figure 6:
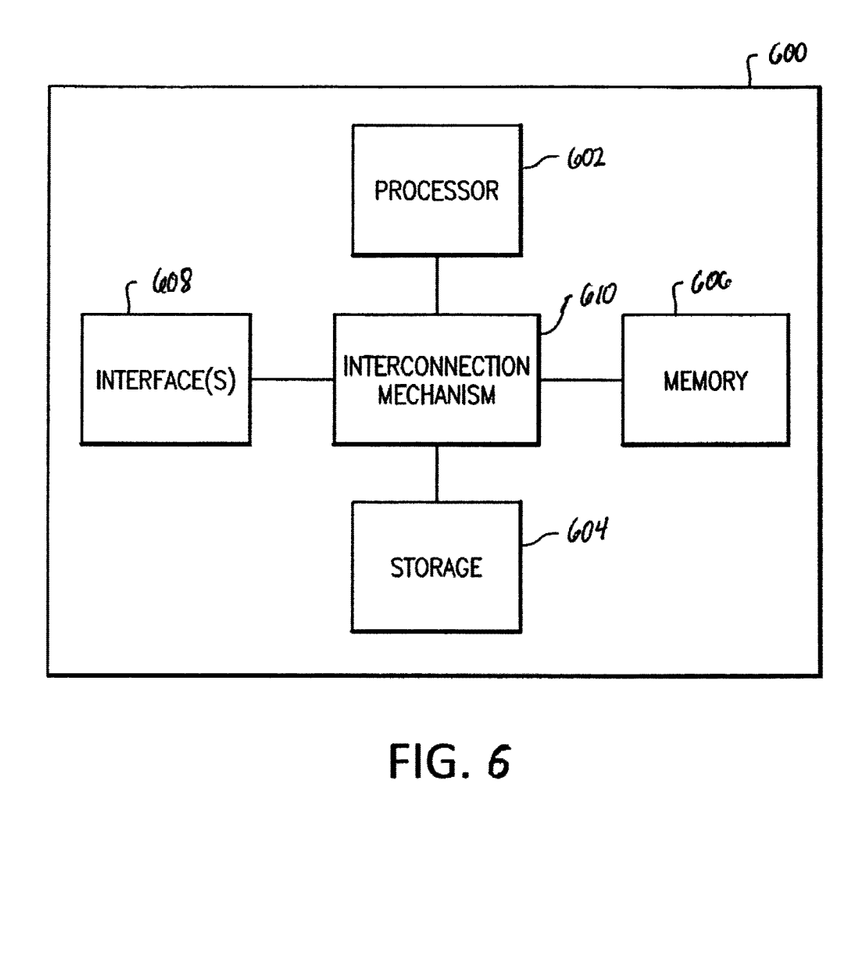
FIG. 6 is a functional block diagram of an example of a processing system that may be configured to implement various examples of the methods described herein.

FIG. 6 illustrates one example of a processing system 600 that may implement predefined software routines corresponding to the control circuit 206 illustrated in FIG. 2 or the control circuit 314 illustrated in FIGS. 3 and 4. The processing system 600 may include a processor 602, data storage 604, a memory 606, and one or more interfaces 608, such as a system interface and/or a user interface. While not explicitly illustrated in FIG. 6, in certain examples the processing system 600 may be coupled to a power source. The power source may deliver power to one or more components of the processing system 600, as well as other components of the corresponding optical sighting device, such as the eye relief actuator 318.

In FIG. 6, the processor 602 is coupled to the data storage 604, memory 606, and the various interfaces 608. The memory 606 stores programs (e.g., sequences of instructions coded to be executable by the processor 602) and data during operation of the processing system 600. Thus, the memory 606 may be a relatively high performance, volatile, random access memory such as a dynamic random access memory ("DRAM") or static memory ("SRAM"). However, the memory 606 may include any device for storing data, such as a disk drive or other nonvolatile storage device. Various examples may organize the memory 606 into particularized and, in some cases, unique structures to perform the functions disclosed herein. These data structures may be sized and organized to store values for particular data and types of data.

The data storage 604 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 602 to perform any of the functions described herein.

In various examples, the processing system 600 includes several interface components 608, such as a system interface and/or a user interface. Each of the interface components 608 is configured to exchange, e.g., send or receive, data with other components of the processing system 600 (and/or associated transmitter or receiver), or other devices in communication with the processing system 600. According to various examples, the interface components 608 may include hardware components, software components, or a combination of hardware and software components. In certain examples, components of the system interface couples the processor 602 to one or more other components of the corresponding optical sighting device. The system interface may provide one or more control signals to any such components and may manage the operation of such components.

A user interface may include hardware and/or software components that allow a corresponding optical sighting device in which the processing system 600 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the processing system 600. Data received at the various interfaces may be provided to the processor 602, as illustrated in FIG. 6. Communication coupling (e.g., shown interconnection mechanism 610) between the processor 602, memory 606, data storage 604, and interface(s) 608 may be implemented as one or more physical busses in conformance with standard, proprietary, or specialized computing bus technologies.

The processor 602 performs a series of routines (e.g., digital signal processing instructions) that result in manipulated data that is stored in and retrieved from the data storage 604, as discussed above. In various examples, execution of the series of instructions result in translation of an aperture stop, or adjustments in a focus setting of a varifocal lens, to align a real exit pupil with an eye in a direction along an optical axis of an optical sighting device, as discussed herein. Such instructions may correspond to commands for determining an axial distance between an eyepiece and an eye, commands for determining an eye relief, and commands for determining a spatial offset between the eye relief and the axial distance to the eye.

The processor 602 may be any type of processor, multiprocessor, or controller. In some examples, the processor 602 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management, and standard database manipulation. One or more of many operating systems may be used, and examples are not limited to any particular operating system or operating system characteristic.

Accordingly, various aspects and examples described herein provide optical sighting devices and methods for automatically adjusting an eyebox depth to substantially align a real exit pupil of an optical sighting device with a user's eye along an optical axis (i.e., in an axial direction). In many examples, the described optical sighting devices are configured to track movement of an operator's eye, and automatically cause the eyebox, including the exit pupil, to follow the movement of the eye. Thus, the described optical sighting devices provide the perception of an expanded eyebox depth by following the spatial movement of the eye in the axial direction.

Having described above several aspects of at least one example, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical sighting device comprising:
   an eyepiece positioned to receive optical radiation along an optical axis and configured to produce a real exit pupil located remote from the eyepiece, the real exit pupil being positioned at an eye relief distance from the eyepiece along the optical axis;
   a digital signal processor configured to determine an axial distance from the eyepiece to an eye positioned proximate the real exit pupil along the optical axis;
   an aperture stop along the optical axis to direct the optical radiation in a direction of the eyepiece;
   a varifocal lens centered along the optical axis and configured to direct the optical radiation in a direction of the eyepiece, the eye relief distance being based at least in part on a focus setting of the varifocal lens; and
   an eye relief actuator operatively coupled to the digital signal processor and configured to act on the aperture stop or the varifocal lens to null a spatial offset between the eye relief distance and the axial distance to the eye.

2. The optical sighting device of claim 1, wherein the eye relief actuator is further configured to translate the aperture stop along the optical axis to align the real exit pupil with the eye along the optical axis.

3. The optical sighting device of claim 2, wherein the eye relief actuator is further configured to continuously translate the aperture stop along the optical axis to move the real exit pupil to track a location of the eye along the optical axis responsive to continuous movement of the location of the eye.

4. The optical sighting device of claim 1, further comprising a range-finder positioned to measure a range from the range-finder to the eye, the axial distance to the eye being determined based at least in part on the range from the range-finder to the eye.

5. The optical sighting device of claim 4, further comprising an infrared illuminator positioned to direct infrared electromagnetic radiation onto the eye, wherein the range-finder is configured to measure the range from the range-finder to the eye based on reflections of the infrared electromagnetic radiation from the eye.

6. The optical sighting device of claim 4, further comprising an encoder positioned to detect the position of the aperture stop, and wherein the digital signal processor is further configured to calculate the eye relief distance based at least in part on the position of the aperture stop.

7. The optical sighting device of claim 1 further comprising front optics configured to receive the optical radiation from a viewed scene and to direct the optical radiation via the aperture stop to the eyepiece.

8. The optical sighting device of claim 1, wherein the optical sighting device is a telescopic sight including a reticle, the reticle being positioned between the aperture stop and the eyepiece to maintain a relationship between the reticle and an observed image during relocation of the real exit pupil.

9. An optical sighting device comprising: an eyepiece positioned to receive optical radiation along an optical axis and configured to produce a real exit pupil located remote from the eyepiece, the real exit pupil being positioned at an eye relief distance from the eyepiece along the optical axis; a digital signal processor configured to determine an axial distance from the eyepiece to an eye positioned proximate the real exit pupil along the optical axis; an aperture stop centered along the optical axis to direct the optical radiation in a direction of the eyepiece, the eye relief distance being based at least in part on a position of the aperture stop along the optical axis; a varifocal lens centered along the optical axis and configured to direct the optical radiation in a direction of the eyepiece, the eye relief distance being based at least in part on a focus setting of the varifocal lens; and an eye relief actuator coupled to at least the varifocal lens and the digital signal processor, the eye relief actuator configured to control the focus setting of the varifocal lens to null a spatial offset between the eye relief distance and the axial distance to the eye.

10. The optical sighting device of claim 9, wherein the eye relief actuator is further configured to control the focus setting of the varifocal lens to align the real exit pupil with the eye along the optical axis.

11. The optical sighting device of claim 10, wherein the eye relief actuator is further configured to continuously control the focus setting of the varifocal lens to move the real exit pupil to track a location of the eye along the optical axis responsive to continuous movement of the location of the eye.

12. The optical sighting device of claim 9, further comprising a range-finder positioned to measure a range from the range-finder to the eye, the axial distance to the eye being determined based at least in part on the range from the range-finder to the eye.

13. The optical sighting device of claim 12, further comprising an infrared illuminator positioned to direct infrared electromagnetic radiation onto the eye, wherein the range-finder is configured to measure the range from the range-finder to the eye based on reflections of the infrared electromagnetic radiation from the eye.

14. A method of automatically adjusting an eyebox of an optical sighting device, the method comprising:
    receiving optical radiation along an optical axis at an eyepiece to produce a real exit pupil located remote from the eyepiece, the real exit pupil being positioned at an eye relief distance from the eyepiece along the optical axis;
    measuring a range from a range-finder to an eye positioned proximate the real exit pupil and along the optical axis;
    determining an axial distance from the eyepiece to the eye based at least in part on the range from the range-finder to the eye;
    determining a spatial offset between the axial distance to the eye and the eye relief distance along the optical axis; and
    reducing the spatial offset between the eye relief distance and the axial distance to the eye to align the eye and the real exit pupil along the optical axis, including controlling a focus setting of a varifocal lens to adjust a focal length of the optical sighting device.

15. The method of claim 14, wherein reducing the spatial offset between the eye relief distance and the axial distance to the eye includes continuously moving the real exit pupil to track a location of the eye along the optical axis responsive to continuous movement of the location of the eye.

16. The method of claim 15, wherein reducing the spatial offset between the eye relief distance and the axial distance to the eye includes translating an aperture stop of the optical sighting device along the optical axis.

17. The method of claim 16, further comprising detecting a position of the aperture stop with an encoder positioned proximate the aperture stop, and calculating the eye relief distance based at least in part on the position of the aperture stop.

18. The method of claim 14, wherein measuring the range to the eye includes triangulating a location of the eye with a plurality of cameras.

19. The method of claim 14, further comprising directing infrared electromagnetic radiation onto the eye, and wherein measuring the range from the range-finder to the eye includes measuring the range based on reflections of the infrared electromagnetic radiation from the eye.

* * * * *